US012158246B2

(12) United States Patent
Kim et al.

(10) Patent No.: US 12,158,246 B2
(45) Date of Patent: Dec. 3, 2024

(54) DEPRESSURIZATION SYSTEM, APPARATUS AND METHOD FOR HIGH PRESSURE GAS DELIVERY

(71) Applicant: Messer Industries USA, Inc., Bridgewater, NJ (US)

(72) Inventors: James Kim, Plantsville, CT (US); Joseph Naumovitz, Lebanon, NJ (US); Tomasz Wolinski, Wallington, NJ (US)

(73) Assignee: Messer Industries USA, Inc., Delaware (DE)

( * ) Notice: Subject to any disclaimer, the term of this patent is extended or adjusted under 35 U.S.C. 154(b) by 0 days.

(21) Appl. No.: 17/544,977

(22) Filed: Dec. 8, 2021

(65) Prior Publication Data

US 2023/0071679 A1 Mar. 9, 2023

Related U.S. Application Data

(60) Provisional application No. 63/236,462, filed on Aug. 24, 2021.

(51) Int. Cl.
*F17C 7/04* (2006.01)

(52) U.S. Cl.
CPC ........ *F17C 7/04* (2013.01); *F17C 2205/0323* (2013.01); *F17C 2221/013* (2013.01);
(Continued)

(58) Field of Classification Search
CPC ................ F17C 7/04; F17C 2205/0323; F17C 2221/013; F17C 2221/014;
(Continued)

(56) References Cited

U.S. PATENT DOCUMENTS 3,164,973 A * 1/1965 Watkins .................. F25B 41/00 62/503
3,827,249 A * 8/1974 Garland .................. F25B 43/00 62/470

(Continued)

OTHER PUBLICATIONS

International Search Report for PCT/US2021/063189, Mar. 1, 2022, Authorized officer: Kari Rodriquez, RO/US, 7 pgs.

(Continued)

*Primary Examiner* — Angelisa L. Hicks
(74) *Attorney, Agent, or Firm* — Joshua L. Cohen

(57) ABSTRACT

An apparatus for depressurizing a pair of accumulators to provide high pressure gas includes a tank in fluid communication with each one of the pair of accumulators for receiving vapor from the pair of accumulators for storage and dispensing the vapor to a remote location other than the pair of accumulators and external atmosphere, a first fluid connection including a first valve assembly interconnecting the tank and a first accumulator of the pair of accumulators, a second fluid connection including a second valve assembly interconnecting the tank and a second accumulator of the pair of accumulators, wherein the first fluid connection with the first valve assembly and the second fluid connection with the second valve assembly are each constructed and arranged to deliver the vapor from a corresponding one of the first accumulator and the second accumulator to the tank during alternating intervals. A related method and system are also provided.

6 Claims, 3 Drawing Sheets

(52) U.S. Cl.
CPC .............................. *F17C 2221/014* (2013.01); *F17C 2223/0123* (2013.01); *F17C 2225/013* (2013.01); *F17C 2227/0302* (2013.01); *F17C 2270/0518* (2013.01)

(58) Field of Classification Search
CPC ........ F17C 2223/0123; F17C 2225/013; F17C 2227/0302; F17C 2270/0518
See application file for complete search history.

(56) References Cited

U.S. PATENT DOCUMENTS

| | | | |
|---|---|---|---|
| 6,327,872 | B1 | 12/2001 | Boyd et al. |
| 2005/0198971 | A1 | 9/2005 | Leitch et al. |
| 2006/0053831 | A1 | 3/2006 | Dube |
| 2012/0156059 | A1 | 6/2012 | Watts |
| 2020/0182408 | A1 | 6/2020 | Nagura et al. |

OTHER PUBLICATIONS

Written Opinion for PCT/US2021/063189, Mar. 1, 2022, Authorized officer: Kari Rodriquez, RO/US, 4 pgs.

Paul Stockman, Carbon Dioxide in Semiconductor Manufacturing High-tech Uses for an Industrial Molecule, Specialty Gas Report—Second Quarter 2016, pp. 22-23, United States, www.specialtygasreport.com.

International Preliminary Report on Patentability for PCT/US2021/063189, Mar. 7, 2024, Authorized officer: Fiona Doherty, 6 pgs.

* cited by examiner

DEPRESSURIZATION SYSTEM, APPARATUS AND METHOD FOR HIGH PRESSURE GAS DELIVERY

BACKGROUND OF THE INVENTION

The present embodiments relate to apparatus and methods used to provide high pressure $CO_2$ from two or more vessels known as accumulators and in particular, to such apparatus and methods used in the electronics industry such as for example in the semiconductor industry.

An accumulator used in the electronics industry is an apparatus that includes a tank or vessel constructed to store fluids at a pressure greater than atmospheric or ambient pressure, and for many applications at a greatly increased pressure. In the electronics industry, such fluids stored in an accumulator can include liquid carbon dioxide ($CO_2$) and liquid nitrogen ($N_2$), which are ultimately permitted to change phase to a gaseous phase for use in such applications as, for example, cleaning of electronics and optics and inerting gases in proximity to same.

Economies of scale encourage the electronics industry to use a pair of accumulators for applications requiring high pressure gaseous $CO_2$. This is because in order to refill one accumulator of the pair that is depleted of $CO_2$ product, the accumulator must be depressurized prior to refilling while the other accumulator of the pair continues with operations. With no other equipment used for such depressurization, this results in a portion of the $CO_2$ during depressurization being vented to atmosphere, an undesirable activity contributing to greenhouse gas (GHG) emissions, and a loss and waste of the gaseous $CO_2$ product.

The known processes to refill a depressurized accumulator, in order to avoid the unwanted $CO_2$ emissions but still be able to recycle and reuse the gaseous $CO_2$ that would otherwise be lost, re-liquefy and recover the $CO_2$ vent gas by cooling the gas through a refrigeration system. Unfortunately, this known recovery process and the related refrigerator system require a large footprint or pad at the processing facility, and consume a large amount of energy and power to re-liquefy and recover the $CO_2$ vent gas, and related costs to re-liquefy the $CO_2$ gas within a specific amount of time allotted for depressurization of the accumulator. This time limitation is critical and therefore burdensome because the refill of the depressurized accumulator must conclude in good time to assume operations from the other accumulator of the pair as the other becomes deleted of its $CO_2$ product.

An example of the known system and method in the semiconductor industry to capture, re-liquefy and pressurize the $CO_2$ gas is shown in FIG. 1.

The known system 10 includes a pair of accumulators 12,14, each of which contains liquid $CO_2$ provided from a source 16 of liquid $CO_2$ through a pipe 18 which is split into a separate branch 20 or pipe in fluid connection with the accumulator 12, and a separate branch 22 or pipe in fluid connection with the accumulator 14, respectively.

The known system 10 is constructed to maintain a continuous supply of high-pressure gaseous $CO_2$, wherein the operating cycle of the system replenishes one of the accumulators 12,14, while the other accumulator is dispensing the $CO_2$ product for industrial and/or commercial use. An example of the operating cycle and corresponding "Modes" of the know system 10 is presented below in Table 1.

Still referring to FIG. 1 in conjunction with Table 1, the known high-pressure gas delivery system is shown generally at 10. As shown in FIG. 1, a first accumulator 12 is constructed and arranged to deliver high pressure gaseous $CO_2$ through fluid connections 28,32,95 or pipes, while a second accumulator 14 is constructed and arranged to deliver high pressure gaseous $CO_2$ through fluid connections 30,32,95 or pipes. While the first accumulator 12 delivers high pressure gaseous $CO_2$ through the fluid connections 28,32,95 or pipes, the second accumulator 14 is off-line from delivery service and is instead being refilled with liquid $CO_2$ from a bulk supply storage tank 16 or vessel containing liquid $CO_2$. However, the accumulator 14 must first be depressurized before the accumulator 14 can be refilled. Depressurization of the accumulator 14 is as follows.

The accumulator 14 is depressurized into receiver 26 through fluid connections 39,44,45 by opening valves 59,47. The $CO_2$ vapor from the accumulator 14 is condensed into a liquid by passing through a heat exchanger in condenser 24, the condenser also in fluid communication with a refrigeration unit, after which the liquefied $CO_2$ is delivered through a fluid connection 45 or pipe into and to be stored in receiver 26. The condensation of the $CO_2$ vapor is achieved through an external refrigeration unit (not shown, but referenced in FIG. 1). Once the accumulator 14 is fully depressurized to the desired or select pressure setpoint, the liquid $CO_2$ temporarily stored in the receiver 26 is delivered back to the accumulator 14 through the fluid connection 46 or pipe into the fluid connection 42 or pipe by opening valve 57 in the fluid connection 42. The accumulator 14 is also refilled to a desired or select level setpoint from the liquid $CO_2$ supply 16, wherein a fluid connection 18 or pipe from the $CO_2$ storage vessel 16 delivers a $CO_2$ feed stream to the accumulator 14 through fluid connection 22 or pipe. The accumulator 14 is heated, e.g., by an electric heater 50, to vaporize the liquid $CO_2$ and pressurize the accumulator 14 to a delivery pressure for the gaseous $CO_2$ stream to be produced by the system 10 and delivered through the pipe 30. The delivery pressure at an outlet 95 of the system 10 is in the range of 600 psig to 1000 psig.

The condenser 24 must condense the $CO_2$ vapor from the accumulator 14 into a liquid during a specific amount of time allotted for depressurization. In other words, when the accumulator 12 nears depletion of its $CO_2$ supply and is required to go off-line in order to be depressurized and refilled, the plant operator does not want there to be a lull in operations waiting for the accumulator 14 to be refilled. Accordingly, the condenser 24 includes a large heat exchanger and refrigeration unit which are required to meet this time sensitive and increased cooling requirement. That is, the depressurization time is set to allow just enough time to fill and pressurize the accumulator 14 before accumulator 12 is depleted of its liquid $CO_2$ supply. This choreography between the accumulators 12,14 and the respective piping and valves is necessary so that a continuous and reliable supply of gaseous $CO_2$ is delivered from the outlet 95 for subsequent plant applications. However, as mentioned above, the known system 10 of FIG. 1 requires a lot of power and energy to accommodate the coaction between the accumulators 12,14 to provide a reliable source of the gaseous $CO_2$ at the system outlet 95.

A reciprocal process is provided when the first accumulator 12 is taken off-line from delivery service and is instead being refilled with liquid $CO_2$ from the bulk supply storage tank 16 or vessel containing liquid $CO_2$.

The Modes in the known system 10 with respect to the accumulators 12,14 are shown in the following Table 1 and pertain to FIG. 1.

TABLE 1

| Mode | Designation | Description of: Accumulator 12 | Accumulator 14 |
|---|---|---|---|
| Offline | 0 | All valves closed, heaters 48, 50 off, refrigeration unit off. | All valves closed, heaters 48, 50 off, refrigeration unit off. |
| Depressurize | 1 | Depressurize accumulator 12 prior to refilling with low-pressure liquid. Depressurization valves 51 and 47 open. Supply valve 49, fill valve 55, product valve 63, and receiver valve 53 closed. Refrigeration unit on. | Depressurize accumulator 14 prior to refilling with low-pressure liquid. Depressurization valves 59 and 47 open. Supply valve 49, fill valve 61, product valve 67, and receiver valve 57 closed. Refrigeration unit on. |
| Fill | 2 | Fill accumulator 12 with low-pressure liquid from receiver 26 and liquid source 16. Receiver valve 53, supply valve 49 and fill valve 55 open. Product valve 63 closed. Refrigeration unit on. | Fill accumulator 14 with low-pressure liquid from receiver 26 and liquid source 16. Receiver valve 57, supply valve 49 and fill valve 61 open. Product valve 67 closed. Refrigeration unit on. |
| Pressurize | 3 | Pressurize accumulator 12 up to the setpoint (i.e., using electric immersion heater 48). Depressurization 51, 47, receiver 53, supply 49, fill 55 and product 63 valves closed. Refrigeration unit off. | Pressurize accumulator 14 up to the setpoint (i.e., using electric immersion heater 50). Depressurization 59, 47, receiver 57, supply 49, fill 61 and product 67 valves closed. Refrigeration unit off. |
| Ready | 4 | System hold at pressure awaits dispensing high-pressure gas 28. Depressurization 51, 47, receiver 53, supply 49, fill 55 and product 63 valves closed. | System hold at pressure awaits dispensing high-pressure gas 30. Depressurization 59, 47, receiver 57, supply 49, fill 61 and product 67 valves closed. |
| Online | 5 | System supplying high-pressure gas 95. Product valve 63 open. Depressurization valve 51 and fill valve 55 closed. | System supplying high-pressure gas 95. Product valve 67 open. Depressurization valve 59 and fill valve 61 closed. |

SUMMARY OF THE INVENTION

In contrast to the know system discussed above, the present inventive embodiments call for the condenser and refrigeration unit to be of smaller construction with a reduced footprint at the plant or facility. As a result, all the $CO_2$ vented during depressurization of an accumulator in the present embodiments is captured and recovered for subsequent use by the accumulator, thereby reducing the capital and operating costs associated with the refrigeration components of the present system.

There is accordingly provided herein a depressurization system for producing high-pressure gas, such as $CO_2$ gas, from a pair of accumulators, which system includes a gas buffer tank assembly consisting of a gas buffer tank for the pair of the accumulators. The gas buffer tank assembly also includes a pair of depressurization valves for each accumulator such that depressurization to the gas buffer tank from both accumulators and from the gas buffer tank to a condenser facilitates overall system depressurization. The gas buffer tank and respective accumulator pressures are equalized by the present embodiments, thereby temporarily holding a portion of intermediate gas from each accumulator in the gas buffer tank before allowing that gas to be condensed and reliquefied for reintroduction into the same accumulator.

In certain embodiments herein there is provided an apparatus for depressurizing a pair of accumulators to provide high pressure gas, which includes: a tank in fluid communication with each one of the pair of accumulators for receiving vapor from the pair of accumulators for storage and dispensing the vapor to a remote location other than the pair of accumulators and external atmosphere; a first fluid connection including a first valve assembly interconnecting the tank and a first accumulator of the pair of accumulators; a second fluid connection including a second valve assembly interconnecting the tank and a second accumulator of the pair of accumulators; wherein the first fluid connection with the first valve assembly and the second fluid connection with the second valve assembly are each constructed and arranged to deliver the vapor from a corresponding one of the first accumulator and the second accumulator to the tank during alternating intervals.

In certain embodiments of the apparatus the remote location includes a condenser to condense the vapor into a liquid.

In certain embodiments the apparatus further includes a receiver tank in fluid connection with the condenser for receiving and storing the liquid until needed by the first accumulator and the second accumulator.

In certain other embodiments of the apparatus the vapor is from a liquid selected from the group consisting of liquid $CO_2$, and liquid nitrogen.

In certain embodiments herein there is provided a method for depressurizing a pair of accumulators for providing high-pressure gas, which includes: (a) withdrawing a portion of vapor from a first accumulator of the pair of accumulators to a tank; (b) equalizing pressures in the first accumulator and the tank for temporarily holding the portion of the vapor as an intermediate gas from the first accumulator in the tank; (c) providing the intermediate gas to a remote location other than the pair of accumulators and atmosphere; (d) condensing the intermediate gas into a liquid at the remote location; and (e) returning the liquid to the first accumulator.

In certain embodiments the method includes providing high-pressure gas from a second accumulator of the pair of accumulators during steps (a)-(e).

In certain other embodiments the method further includes storing the liquid at the remote location before the returning the liquid to the first accumulator.

In certain other embodiments the method includes the vapor being from a liquid selected from the group consisting of liquid $CO_2$, and liquid nitrogen.

BRIEF DESCRIPTION OF THE DRAWINGS

For a more complete understanding of the present invention, reference may be had to the following description of exemplary embodiments considered in connection with the accompanying drawing Figures, of which.

DETAILED DESCRIPTION OF THE INVENTION

Before explaining the inventive embodiments in detail, it is to be understood that the invention is not limited in its application to the details of construction and arrangement of parts illustrated in the accompanying drawings, if any, since the invention is capable of other embodiments and being practiced or carried out in various ways. Also, it is to be understood that the phraseology or terminology employed herein is for the purpose of description and not of limitation.

In the following description, terms such as a horizontal, upright, vertical, above, below, beneath and the like, are to be used solely for the purpose of clarity illustrating the invention and should not be taken as words of limitation. The drawings, if any, are for the purpose of illustrating the invention and are not intended to be to scale.

References herein to "fluid connections" can be taken to mean a conduit, pipe, passageway or the like which provides for delivery or fluid communication of fluids, and also includes the plural of such elements.

Figure 2:
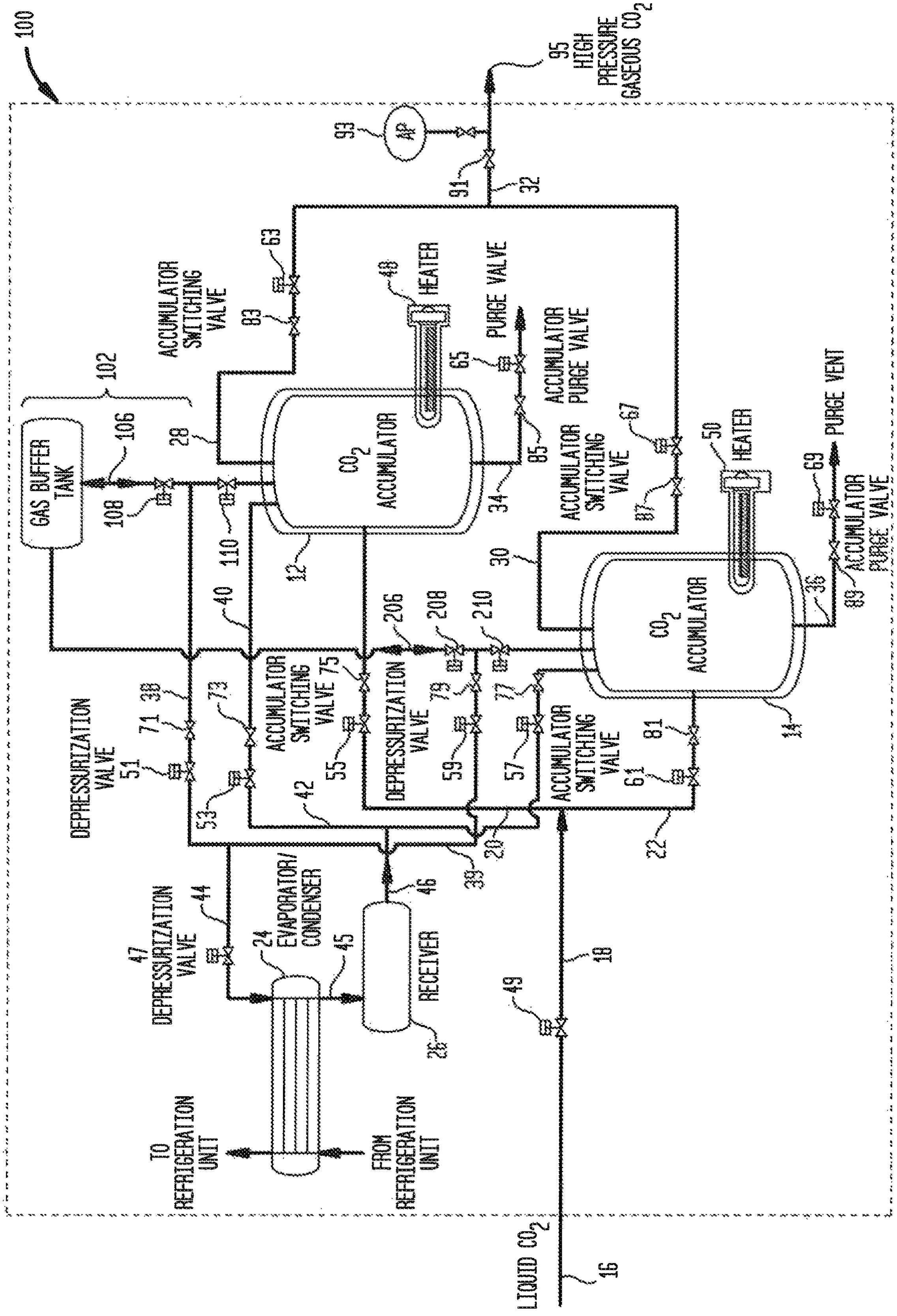
FIG. 2 shows a schematic of a depressurization system, and apparatus and method embodiments of the present invention for high pressure gas delivery of, for example, $CO_2$ gas.
Figure 3:
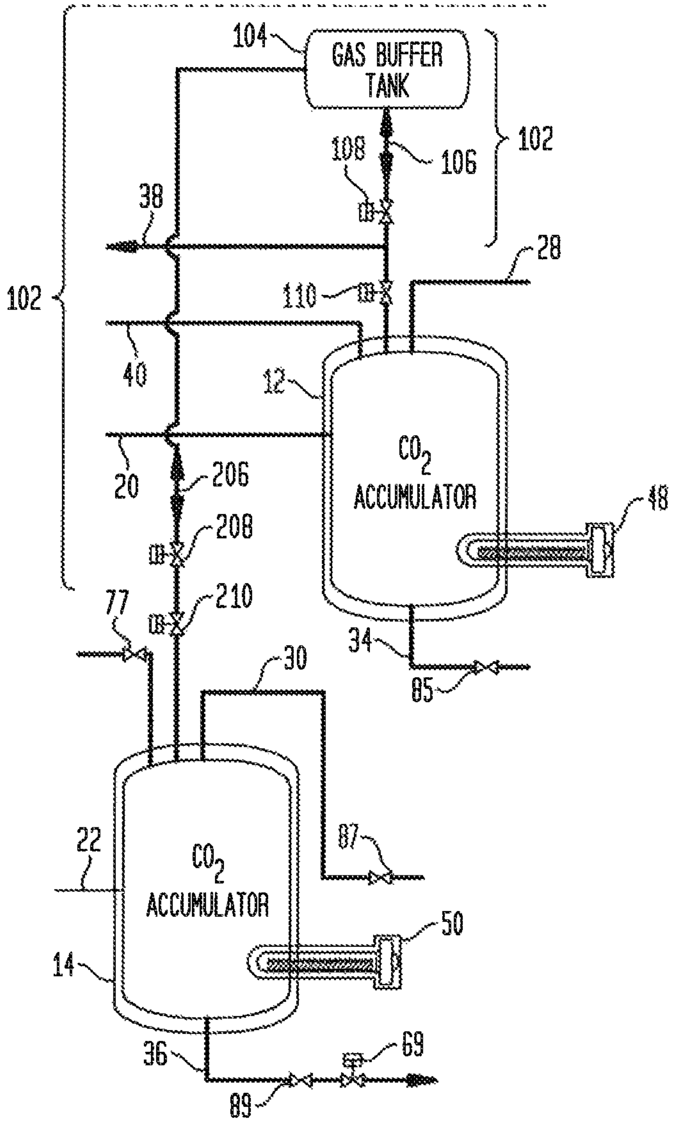
FIG. 3 shows a gas buffer tank embodiment of the present invention used in the system embodiment shown in FIG. 2.

Referring to FIGS. 2-3, the inventive embodiments herein include a depressurization system 100 with, among other elements, gas buffer tank assembly 102 (hereinafter referred to also as the "buffer tank assembly 102"). The buffer tank assembly 102 can be retrofit into or be of original construction with the known system 10 for co-action with the accumulators 12,14. The buffer tank assembly 102 collects a portion if not all of the $CO_2$ gas generated during depressurization from a respective one of the accumulators 12,14 to equalize the pressures between same in order to temporarily store the $CO_2$ vapor and separate the depressurization stage into two separate stages. The buffer tank assembly 102 includes a gas buffer tank 104 as shown in FIGS. 2-3. That is, with respect to the accumulator 12 the buffer tank assembly 102 includes the gas buffer tank 104, the fluid connection 106 or pipe and the valve 108; and with respect to the accumulator 14 the buffer tank assembly 102 includes the gas buffer tank 104, the fluid connection 206 or pipe and the valve 208.

Figure 1:
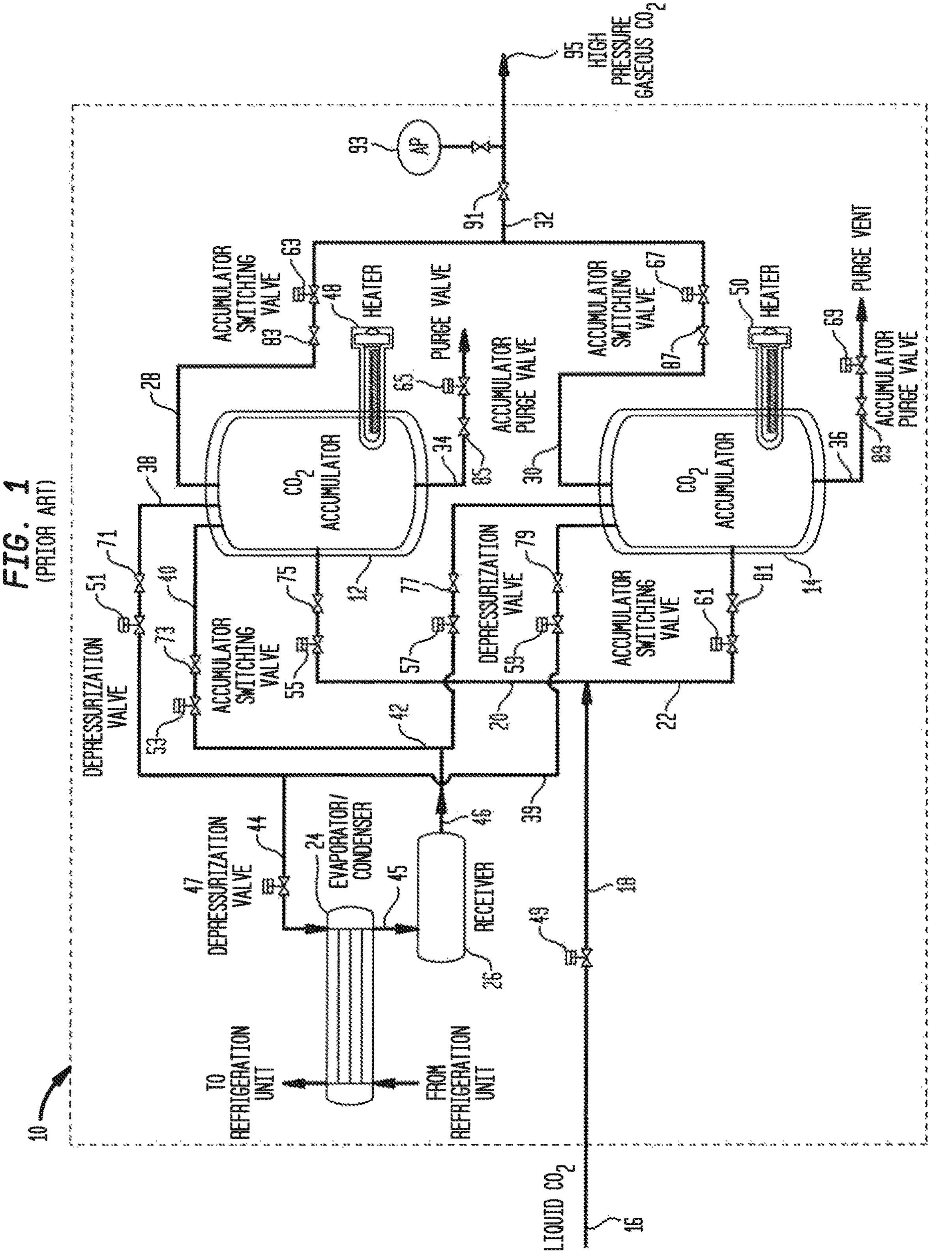
FIG. 1 (PRIOR ART)
FIG. 1 shows a schematic of a known system for depressurizing gas to provide high pressure $CO_2$.

The depressurization system embodiment 100 is a high-pressure gas delivery system, and which differs from the known system 10 of FIG. 1 by the addition of a gas buffer tank 104 and its corresponding piping and valves (valve assemblies) to and from each one of the accumulators 12,14. The system 100 is constructed and arranged to maintain a continuous supply of high-pressure gaseous $CO_2$, wherein an operating cycle of the buffer tank assembly 102 is set to replenish a first one of the accumulators 12,14, while a second one of the accumulators is dispensing the $CO_2$ gaseous product. In this manner of construction and operation, there is no lag, lull or downtime during the on-demand $CO_2$ supply, and there is required a far smaller condenser and refrigeration unit footprint or pad for depressurization of the accumulators 12,14, than is required for the known system 10. An example of the operating cycle and corresponding "Modes" is presented below in Table 2.

The high-pressure gas delivery system is shown generally at 100. A first accumulator 12 delivers high pressure gaseous $CO_2$ through fluid connections 28, 32 or pipes to the outlet 95 for use in a gaseous application, while a second accumulator 14 is refilled from a bulk supply of liquid $CO_2$ 16. The second accumulator 14 must be refilled and ready to assume operations before the first accumulator 12 is depleted of its $CO_2$. The accumulator 14 must first be depressurized before it can be refilled with liquid $CO_2$. The depressurization of the accumulator 14 occurs in two stages: $1^{st}$ stage—the accumulator 14 is initially depressurized into the gas buffer tank 104 of the buffer tank assembly 102 until such time as the respective pressures in the accumulator 14 and the gas buffer tank 104 are equalized to temporarily store a portion of the $CO_2$ vapor in the gas buffer tank 104; $2^{nd}$ stage—the accumulator 14 is then fully depressurized into receiver 26 via the fluid connections 39,44 into the condenser 24, whereupon the $CO_2$ vapor is condensed into a liquid. Such condensation is achieved through an external refrigeration unit (not shown) and the condensed liquid provided to the receiver 26 via a fluid connection 45 from the condenser 24 to the receiver. Once the accumulator 14 is fully depressurized to the desired pressure setpoint, the liquid $CO_2$ temporarily stored in the receiver 26 is delivered back to the accumulator 14 through fluid connections 46,42 by opening valve 57. The accumulator 14 is also refilled or topped-off to the desired level setpoint with additional liquid from the liquid $CO_2$ supply 16, where a feed stream 18 comprising liquid $CO_2$ is introduced into the accumulator 14 through fluid connection 22. The accumulator 14 is heated (e.g., by an electric heater 50) to vaporize the liquid $CO_2$ stored in the accumulator and to pressurize same to a delivery pressure for the gaseous $CO_2$ stream to be produced by the system 100 and delivered through fluid connections 30,32 to the outlet 95 for application use. The delivery pressure at the outlet 95 is in the range of 600 psig to 1000 psig.

While the accumulator 14 is getting refilled and pressurized, the gas buffer tank 104 is depressurized into the receiver 26 via fluid connections 206,39,44,45, where the $CO_2$ vapor is condensed into a liquid by the heat exchanger in the condenser 24. Such condensation is achieved through an external refrigeration unit (not shown, but referred to) in communication with the heat exchanger of the condenser 24. The liquid $CO_2$ is also held temporarily in the receiver 26 until the next cycle, wherein the liquid $CO_2$ will be delivered to the accumulator 12 via fluid connections 46,40 or pipes after that accumulator undergoes its depressurization stages.

By initially equalizing the pressures between the accumulator 14 and the gas buffer tank 104 before fully depressurizing the accumulator 14, the amount of $CO_2$ vapor to be condensed in the condenser 24 during this stage is substantially less than what occurs with the known system 10. By temporarily holding a portion of the $CO_2$ vapor in the gas buffer tank 104, the process of condensing the $CO_2$ vapor can be extended over a longer timeframe to thereby reduce the cooling requirement of the condenser 24; instead of being constrained to the strict amount of time allotted for depressurizing the accumulator 14 as is required in the known system 10. Depressurizing the gas buffer tank 104 and condensing the corresponding $CO_2$ vapor occurs during the filling and pressurizing steps of the accumulator 14. This in turn also allows the refrigeration unit to run continuously or nearly continuously to avoid frequent cycling.

The Modes in the system embodiment 100 with respect to the accumulators 12,14 are shown in the following Table 2 and pertain to FIGS. 2-3.

TABLE 2

| Mode | Designation | Description of: Accumulator 12 | Accumulator 14 |
|---|---|---|---|
| Offline | 0 | All valves closed, heaters 48, 50 off, refrigeration unit off. | All valves closed, heaters 48, 50 off, refrigeration unit off. |
| Equalize | 1 | Initially depressurize accumulator 12 into gas buffer tank 104 to equalize pressures. Depressurization valves 108 and 110 open. Depressurization valves 51 and 47, supply valve 49, fill valve 55, product valve 63, and receiver valve 53 closed. | Initially depressurize accumulator 14 into gas buffer tank 104 to equalize pressures. Depressurization valves 208 and 210 open. Depressurization valves 59 and 47, supply valve 49, fill valve 61, product valve 67, and receiver valve 57 closed. |
| Depressurize | 2 | Complete accumulator 12 depressurization prior to refilling with low-pressure liquid. Depressurization valves 110, 51 and 47 open. Depressurization valve 108, supply valve 49, fill valve 55, product valve 63, and receiver valve 53 closed. Refrigeration unit on. | Complete accumulator 14 depressurization prior to refilling with low-pressure liquid. Depressurization valves 210, 59 and 47 open. Depressurization valve 208, supply valve 49, fill valve 61, product valve 67, and receiver valve 57 closed. Refrigeration unit on. |
| Fill | 3 | Fill accumulator 12 with low-pressure liquid from receiver 26 and liquid source 16. Receiver valve 53, supply valve 49 and fill valve 55 open. Product valve 63 closed. Refrigeration unit on. | Fill accumulator 14 with low-pressure liquid from receiver 26 and liquid source 16. Receiver valve 57, supply valve 49 and fill valve 61 open. Product valve 67 closed. Refrigeration unit on. |
| Depressurize Gas Buffer | 4a | Depressurize gas buffer tank 104. Depressurization valves 108, 51, and 47 open. Depressurization valve 110 and receiver valve 53 closed. Refrigeration unit on. | Depressurize gas buffer tank 104. Depressurization valves 208, 59, and 47 open. Depressurization valve 210 and receiver valve 57 closed. Refrigeration unit on. |
| Pressurize | 4b | Pressurize accumulator 12 up to the setpoint (i.e., using electric immersion heater 48). Supply 49, fill 55 and product 63 valves closed. Refrigeration unit on. | Pressurize accumulator 14 up to the setpoint (i.e., using electric immersion heater 50). Supply 49, fill 61 and product 67 valves closed. Refrigeration unit on. |
| Ready | 5 | System hold at pressure awaits dispensing high-pressure gas 28. Depressurization 108, 110, 51, 47, receiver 53, supply 49, fill 55 and product 63 valves closed. | System hold at pressure awaits dispensing high-pressure gas 30. Depressurization 208, 210, 59, 47, receiver 57, supply 49, fill 61 and product 67 valves closed. |
| Online | 6 | System supplying high-pressure gas 95. Product valve 63 open. Depressurization valves 108, 110, 51, fill valve 55 and receiver valve 53 closed. | System supplying high-pressure gas 95. Product valve 67 open. Depressurization valves 208, 210, 59, fill valve 61 and receiver valve 57 closed. |

The system 100 is therefore more economical than the known system 10 due to the reduction in size of the refrigeration unit and the condenser 24.

The depressurization cycle stages for and the co-action among the accumulators 12,14 and the gas buffer tank 104 of the buffer tank assembly 102 can be summarized as:

1. Equalize the respective accumulator 12,14 and the gas buffer tank 104 pressures.
2. Depressurize the accumulator/re-liquefy $CO_2$ to fill the receiver 26.
3. Fill the accumulator from the receiver.
4. Fill the accumulator from the liquid $CO_2$ feed 16 and begin to depressurize the gas buffer tank 104/re-liquify to fill the receiver 26.
5. Pressurize the accumulator with the respective heater 48,50.
6. Complete depressurization of the gas buffer tank 104 (the receiver 26 is now partially filled with $CO_2$ liquid), and standby.
7. Switchover and dispense high pressure $CO_2$ from the $1^{st}$ accumulator when the 2nd accumulator is depleted.
8. Start depressurization cycle on the $2^{nd}$ accumulator.
9. Repeat.

The gas buffer tank 104 reduces an amount of $CO_2$ gas leaving the accumulator 12,14 during depressurization of same and offers more time to re-liquefy the $CO_2$ gas through the condenser 24 and the refrigeration unit. The condenser 24-refrigeration unit size and related footprint is significantly reduced as a result of the addition of time from the gas buffer tank 104 and therefore, the related capital and operating costs for the system 100 are also reduced. The present embodiments provide a cost-effective solution to capture all the $CO_2$ gas during depressurization in order to (i) avoid a loss of the $CO_2$ product, (ii) avoid an increase in GHG emissions, and (iii) reduce the size of the condenser/refrigeration unit to condense the $CO_2$ vapor.

Manual valves 71-93 (odd-numbered) are provided for shut-off and partial closure of corresponding fluid connections or pipes to adjust timing of vapor and liquid being delivered through the respective systems 10,100, and one or plurality of same can be included depending upon the system application.

This present embodiments can be applied to other liquid products (e.g., liquid nitrogen or LIN) using the same apparatus and processes herein, wherein the liquid is heated inside an accumulator or a vessel to deliver a high-pressure gas, and to recover and use any gas or vapor in a cost-effective way that would otherwise be vented.

Even without adding the condenser 24 with its heat exchanger and the refrigeration unit, the gas buffer tank 104 will substantially reduce an amount of vent gas during depressurization.

It will be understood that the embodiments described herein are merely exemplary, and that a person skilled in the art may make variations and modifications without departing from the spirit and scope of the invention. All such variations and modifications are intended to be included within the scope of the invention as provided in the appended claims. It should be understood that the embodiments described above are not only in the alternative but can be combined.

What is claimed is:

1. An apparatus for depressurizing a pair of accumulators to provide high pressure gas, comprising:

a gas buffer tank in fluid communication with each one of the pair of accumulators for receiving vapor from the pair of accumulators for storage and dispensing the vapor to a condenser, to condense the vapor into a liquid, other than the pair of accumulators and external atmosphere;

a first fluid connection including a first valve assembly interconnecting the gas buffer tank and a first accumulator of the pair of accumulators;

a second fluid connection including a second valve assembly interconnecting the gas buffer tank and a second accumulator of the pair of accumulators;

a receiver tank in fluid connection with the condenser for receiving and storing the liquid until needed by the first accumulator and the second accumulator;

wherein the first fluid connection with the first valve assembly and the second fluid connection with the second valve assembly are each constructed and arranged to deliver the vapor from a corresponding one of the first accumulator and the second accumulator to the gas buffer tank during alternating intervals.

2. The apparatus of claim 1, wherein the vapor is from a liquid selected from the group consisting of liquid $CO_2$, and liquid nitrogen.

3. A method for depressurizing a pair of accumulators for providing high-pressure gas, comprising:

(a) withdrawing a portion of vapor from a first accumulator of the pair of accumulators to a gas buffer tank;

(b) equalizing pressures in the first accumulator and the gas buffer tank for temporarily holding the portion of the vapor as an intermediate gas from the first accumulator in the gas buffer tank;

(c) providing the intermediate gas to a condenser other than the pair of accumulators and atmosphere;

(d) condensing the intermediate gas into a liquid at the condenser;

(e) providing a receiver tank in fluid connection with the condenser for receiving and storing the liquid until needed by the first accumulator; and (f) returning the liquid to the first accumulator.

4. The method of claim 3, further comprising providing high-pressure gas from a second accumulator of the pair of accumulators during steps (a)-(f).

5. The method of claim 3, further comprising storing the liquid at the condenser before the returning the liquid to the first accumulator.

6. The method of claim 3, wherein the vapor is from a liquid selected from the group consisting of liquid $CO_2$, and liquid nitrogen.

* * * * *